(12) United States Patent
Kim et al.

(10) Patent No.: US 11,181,495 B2
(45) Date of Patent: Nov. 23, 2021

(54) RAINWATER DETECTION DEVICE USING ELECTRIC WIRES

(71) Applicant: National Institute of Meteorological Sciences, Seogwipo-si (KR)

(72) Inventors: Geon Tae Kim, Gangneung-si (KR); Seon Jeong Kim, Gangneung-si (KR); Yoo Jun Kim, Gangneung-si (KR); Baek Jo Kim, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 17/185,158

(22) Filed: Feb. 25, 2021

(65) Prior Publication Data

US 2021/0278354 A1   Sep. 9, 2021

(30) Foreign Application Priority Data

Mar. 5, 2020  (KR) ........................ 10-2020-0027732

(51) Int. Cl.
*G01N 27/04* (2006.01)
*G01N 17/00* (2006.01)
*B60S 1/08* (2006.01)
*G01D 5/24* (2006.01)

(52) U.S. Cl.
CPC ............ *G01N 27/04* (2013.01); *B60S 1/0825* (2013.01); *B60S 1/0851* (2013.01); *G01N 17/00* (2013.01); *G01D 5/24* (2013.01)

(58) Field of Classification Search
CPC ...... G01N 17/00; G01N 27/04; G01N 27/205; B60S 1/0822; B60S 1/0825; B60S 1/0818; B60S 1/0851; G01D 5/2405; G01D 5/24; A61F 5/48; A61B 5/053; A61B 5/6808
See application file for complete search history.

(56) References Cited

U.S. PATENT DOCUMENTS 5,780,719 A * 7/1998 VanDam ............... B60S 1/0818
                                                  318/483
6,646,560 B1 * 11/2003 Krasenics, Jr. ......... F24F 7/013
                                                  340/602

FOREIGN PATENT DOCUMENTS

CN    203745408 U    7/2014
KR    20150076896 A  7/2015

* cited by examiner

*Primary Examiner* — Amy He
(74) *Attorney, Agent, or Firm* — Ashok Tankha (57) ABSTRACT

A rainwater detection device for detecting rainwater is provided. The rainwater detection device includes: a panel having a surface; rainwater sensing wires on the surface; and a rainwater sensor (i) physically connected with the rainwater sensing wires without an electrical connection if a condition is unsatisfied and (ii) physically and electrically connected with the rainwater sensing wires if the condition is satisfied; wherein a first wire, one of the rainwater sensing wires, is separated from a second wire, another of the rainwater sensing wires, by an interval, without contacting each other and wherein the rainwater sensing wires are connected to opposite polarity of an electrode connected with the rainwater sensor, and wherein the condition is that a first state where no current flows between the first and the second wires is changed to a second state where current flows between the first and the second wires due to the rainwater.

6 Claims, 7 Drawing Sheets

(PRIOR ART)

FIG. 6

(PRIOR ART)

RAINWATER DETECTION DEVICE USING ELECTRIC WIRES

CROSS-REFERENCE TO RELATED APPLICATIONS

This application claims priority to and the benefit of the provisional/non-provisional patent application titled "Rainwater Detection Device Using Electric Wires", application number 10-2020-0027732, filed in the Korean Intellectual Property Office (KIPO) on Mar. 5, 2020. The specification of the above referenced patent application is incorporated herein by reference in its entirety.

FIELD OF THE INVENTION

The present disclosure relates to a rainwater detection device using electric wires for efficiently detecting rainwater.

BACKGROUND

Devices capable of detecting a rainfall, one of meteorological conditions, have been developed in various shapes so far. As one such device, a conventional rainwater detection device using a pair of plate-shaped conductors is shown in FIGS. 5 and 6.

Figure 5:
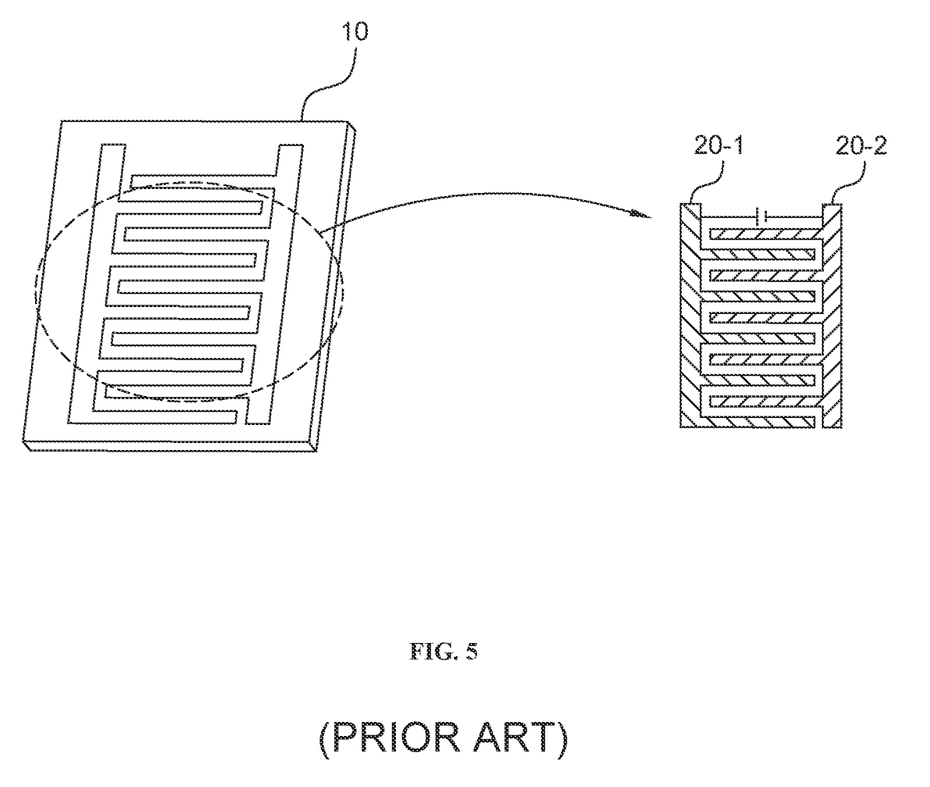
FIG. 5 is a drawing schematically illustrating a conventional rainwater detection device using a pair of plate-shaped conductors.
Figure 6:
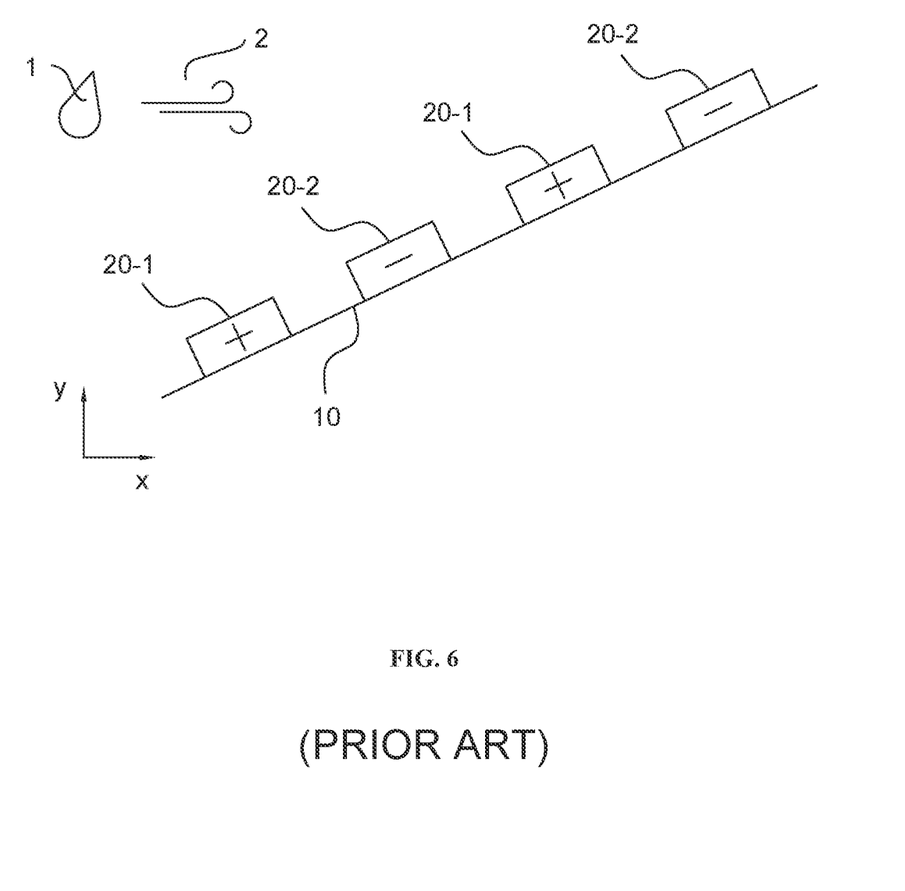
FIG. 6 is a drawing schematically illustrating a cross section of a panel installed at a predetermined angle with ground and a cross section of the plate-shaped conductors included in the conventional rainwater detection device.

FIG. 5 is a drawing schematically illustrating the conventional rainwater detection device using the pair of the plate-shaped conductors and FIG. 6 is a drawing schematically illustrating a cross section of a panel installed at a predetermined angle with the ground and a cross section of the plate-shaped conductors disposed on the panel of the conventional rainwater detection device.

By referring to FIG. 5, the conventional rainwater detection device includes the pair of the plate-shaped conductors 20-1 and 20-2, in a shape of "E" disposed on the panel 10. And each of the plate-shaped conductors is coupled as corresponding to each other with a predetermined gap formed therebetween, for detecting the rainwater fallen in-between. Herein, in order to improve accuracy of rainwater detection, rainwater sensing areas formed with gaps between the pair on the panel 10 have to be increased, however, since the plate-shaped conductors 20-1 and 20-2 require additional surface areas that just take up space and not used for the rainwater detection, the rainwater sensing areas cannot be increased efficiently.

In addition, by referring to FIG. 6, when the panel 10 is installed parallel to the ground, the rainwater, a water droplet directly formed on each of the plate-shaped conductors 20-1 and 20-2 cannot be detected, thus the panel 10 has to be installed at the predetermined angle with the ground in order to allow the rainwater to flow across the gaps between the pair of plate-shaped conductors 20-1 and 20-2.

For reference, FIG. 6 illustrates an x axis in a direction parallel to the ground, a y axis in a direction pointing at the sky and perpendicular to the ground, and the panel 10 installed at the predetermined angle from the x axis.

However, the conventional rainwater detection device, whose panel 10 must be installed at the predetermined angle with the ground as described above, cannot properly detect the rainwater 1 which will be prevented from falling onto the panel 10 if wind 2 blows in a direction away from the panel 10.

Accordingly, there is a need for a rainwater detection device capable of more efficiently detecting the rainwater by compensating for disadvantages of the conventional rainwater detection device.

SUMMARY OF THE INVENTION

It is an object of the present disclosure to solve all the aforementioned problems.

It is another object of the present disclosure to provide a rainwater detection device having a structure of denser rainwater detection regions formed with electric wires, resulting in an efficient detection of rainwater.

It is still another object of the present disclosure to provide the rainwater detection device which detects the rainwater in various rainfall conditions and whose panel can be installed parallel to the ground.

It is still yet another object of the present disclosure to provide rainwater drains for discharging residual rainwater already detected, to thereby allow the rainwater detection device to efficiently detect new rainwater.

In order to accomplish objects above and characteristic effects to be described later of the present disclosure, distinctive structures of the present disclosure are described as follows.

In accordance with one aspect of the present disclosure, there is provided a rainwater detection device for detecting rainwater, including: a panel having at least one specific surface; a pair of rainwater sensing wires disposed on the specific surface of the panel; and a rainwater sensor (i) physically connected with each end of the pair of the rainwater sensing wires without an electrical connection therewith if an electrical condition is not satisfied and (ii) physically and electrically connected with said each end of the pair of the rainwater sensing wires if the electrical condition is satisfied; wherein each of the pair of the rainwater sensing wires is disposed on the specific surface of the panel such that a first wire, which is one of the pair of the rainwater sensing wires, is separated from a second wire, which is the other of the pair of the rainwater sensing wires, by a specific interval, without physically contacting each other and wherein each end of the pair of the rainwater sensing wires is connected to each end of opposite polarity of an electrode included in or connected with the rainwater sensor, and wherein the electrical condition is that a first state in which no current flows between the first wire and the second wire on the specific surface is changed to a second state in which current flows between the first wire and the second wire on the specific surface due to the rainwater.

As one example, the first wire includes continuous first unit wires and wherein the second wire includes continuous second unit wires, wherein the first unit wires and the second unit wires are disposed on the specific surface such that (i) each of the first unit wires corresponds to each of the second unit wires, (ii) each of the first unit wires is separated from its corresponding each of the second unit wires by the specific interval, and (iii) each first group comprised of a certain number of the first unit wires and each second group comprised of a certain number of the second unit wires form a preset specific unit pattern, and wherein each of adjacent ones among the first unit wires is connected with each other and each of adjacent ones among the second unit wires is connected with each other.

As one example, the specific surface of the panel includes (i) a first edge and a second edge opposite to each other and (ii) a third edge and a fourth edge opposite to each other and perpendicular to the first edge and the second edge, wherein (i) the first wire is disposed on the specific surface such that the first wire forms a continuous first path and (ii) the second wire is disposed on the specific surface such that the second wire forms a continuous second path, wherein the first unit wires and the second unit wires are disposed on the specific surface such that (i) certain parts of the first unit wires and certain parts of the second unit wires are comprised of a (1_1)-st partial unit wire to a (1_n)-th partial unit wire disposed perpendicular to the first edge and the second edge, wherein n is an integer equal to or greater than 1 and (ii) if n is larger than 1, specific parts of the first unit wires and specific parts of the second unit wires are comprised of a (2_1)-st partial unit wire to a (2_(n−1))-th partial unit wire disposed perpendicular to the third edge and the fourth edge, wherein a (2_k)-th partial unit wire connects one end of a (1_k)-th partial unit wire with another end of a 1_(k+1)-th partial unit wire among the (1_1)-st partial unit wire to the (1_n)-th partial unit wire and wherein said another end of the 1_(k+1)-th partial unit wire is located opposite to one end of the 1_(k+1)-th partial unit wire farther from the (2_k)-th partial unit wire and such that the (1_k)-th partial unit wire, the (2_k)-th partial unit wire, and the 1_(k+1)-th partial unit wire are connected in sequence, k being an integer ranging from 1 to n−1, and wherein the specific unit pattern, formed by each first group and each second group, is repeated in a direction perpendicular to the third edge and the fourth edge.

As one example, insulation material is applied and hardened from a bottom of the specific surface to a specific height of the first wire and the second wire and wherein the specific height is lower than each height of the first wire and the second wire, in order to fix the first wire and the second wire in a state of being separated by the specific interval.

As one example, at least part of upper portions, without insulation, of the first wire and the second wire forms an arc with a curvature such that (i) the rainwater fallen on at least part, among the upper portions, of a specific rainwater sensing wire, which is one among the first wire and the second wire, flows along a side of the specific rainwater sensing wire due to the arc and (ii) the rainwater comes into contact with the other one among the first wire and the second wire, and as a result, the current flows between the first wire and the second wire.

As one example, each of the first wire and the second wire includes conducting material and wherein at least part of the conducting material is exposed such that one or more conducting regions, where the current flows through the rainwater if the rainwater comes into contact with the exposed conducting material, are present, and wherein each of the conducting regions of the first wire and its corresponding each of the conducting regions of the second wire are disposed within a particular distance.

As one example, the rainwater detection device further includes a sensing information processing module and wherein (i) the rainwater sensor transmits sensing information, including information on voltage, current, and resistance of the first wire and the second wire, to the sensing information processing module, (ii) the sensing information processing module analyzes the sensing information, and thus (iii) result information, including information on whether the rainwater is detected, is provided.

As one example, one or more rainwater drains, controlled to be opened to remove the rainwater remaining on the specific surface after detection of the rainwater is completed, are formed on one or more specific locations on the specific surface.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE INVENTION

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
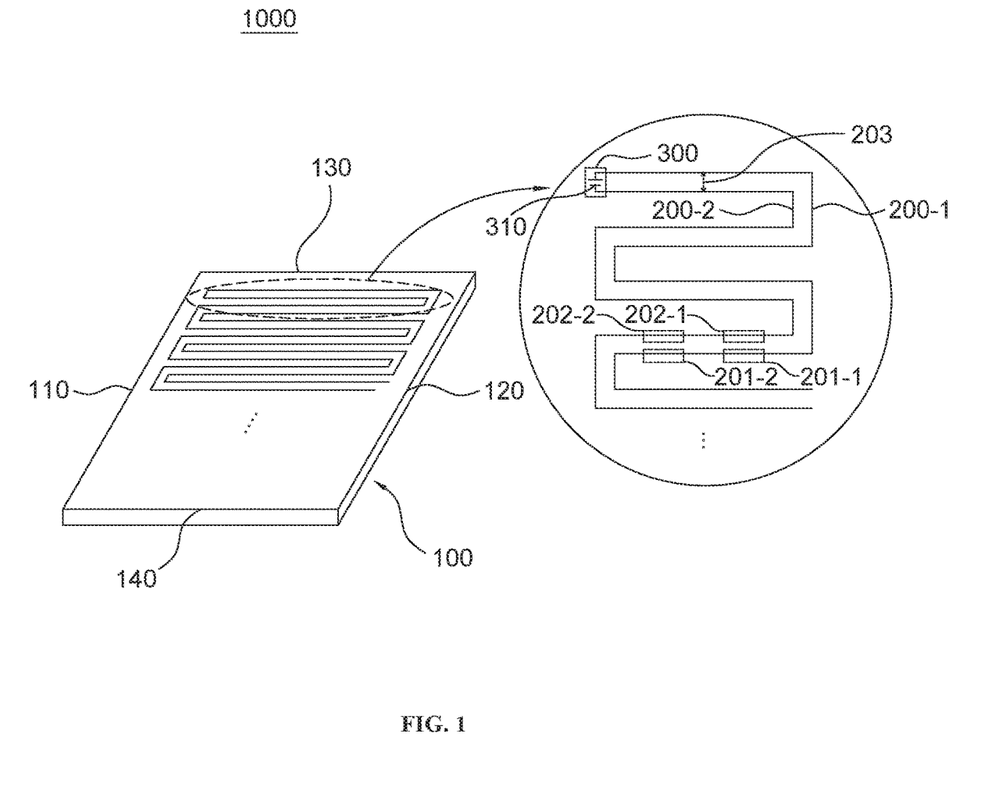
FIG. 1 is a drawing schematically illustrating a rainwater detection device in accordance with one example embodiment of the present disclosure.

FIG. 1 is a drawing schematically illustrating a rainwater detection device in accordance with one example embodiment of the present disclosure.

By referring to FIG. 1, the rainwater detection device 1000 of the present disclosure may include a panel 100 having at least one specific surface; a pair of rainwater sensing electric wires 200-1 and 200-2 for sensing rainwater disposed on the specific surface of the specific panel 100 in a certain pattern; and a rainwater sensor (not shown). Herein, the rainwater sensor may be only physically connected with each end of the pair of the rainwater sensing wires without an electrical connection therewith if an electrical condition to be explained later is not satisfied. Otherwise, if the electrical condition is satisfied, the rainwater sensor may be physically and electrically connected with said each end of the pair of the rainwater sensing wires. Herein, a first wire 200-1, which is one among the rainwater sensing electric wires 200-1 and 200-2, and a second wire 200-2, which is the other one among the rainwater sensing electric wires 200-1 and 200-2, may be disposed with a specific interval 203 therebetween so that the first wire 200-1 and the second wire 200-2 do not contact each other on the specific surface. Also, the specific interval 203 may change according to examples of the present disclosure, and the first wire 200-1 and the second wire 200-2 may be disposed with a variable specific interval therebetween within a scope capable of detecting the rainwater of the present disclosure.

And each of the first wire 200-1 and the second wire 200-2 may be physically connected to each end of opposite polarity of an electrode 310. Herein, said each end may be included in or connected with a rainwater sensor 300. Further, current may flow in a closed circuit including the rainwater sensor 300, the first wire 200-1, and the second wire 200-2 if the electrical condition is satisfied.

Specifically, since the first wire 200-1 and the second wire 200-2 do not physically contact each other, in case the electrical condition is not satisfied, no current flows between the first wire 200-1 and the second wire 200-2 even if voltage is applied to the electrode 310, thus the rainwater sensor 300 waits at a first state in which no current flows between the first wire 200-1 and the second wire 200-2. However, if the first wire 200-1 and the second wire 200-2 become electrically connected due to the rainwater, the current can flow through the rainwater between the first wire 200-1 and the second wire 200-2, thus the rainwater sensor 300 moves on to a second state in which the current flows between the first wire 200-1 and the second wire 200-2, and as a result, the detection of the rainwater is achieved based on information on such an electrical change.

Herein, result information, including information on whether the rainwater is detected and information on the rainwater, e.g., an amount of the rainwater, may be generated directly by the rainwater sensor 300 based on the information on the electrical change between the first wire 200-1 and the second wire 200-2 and then may be provided to a user. However, as another example in which the rainwater detection device 1000 further includes a sensing information processing module (not illustrated), (i) the rainwater sensor 300 may transmit sensing information, including information on voltage, current, and resistance of the first wire 200-1 and the second wire 200-2, to the sensing information processing module, (ii) the sensing information processing module may analyze the sensing information, and thus (iii) the result information, including the information on whether the rainwater is detected, may be provided to the user.

And as one example, the rainwater sensor 300 or the sensing information processing module as described above may be installed inside the panel 100 or on a separate location connected with the rainwater detection device 1000. And each of the first wire 200-1 and the second wire 200-2 may be extended to the rainwater sensor 300 through the inside of the panel 100. Herein, each end of the first wire 200-1 and the second wire 200-2 may be included in the rainwater sensor 300 or connected with the electrode 310.

Next, each of the first wire 200-1 and the second wire 200-2 may include conducting material. And at least part of the conducting material may be exposed such that one or more exposed conducting regions 201-1, 201-2, 202-1, and 202-2, where the current can flow through the rainwater if the rainwater comes into contact with the exposed conducting material to electrically connect the first wire 200-1 and the second wire 200-2, may be present. Herein, as one example, if the first wire 200-1 and the second wire 200-2 are coated with insulators, multiple regions, where the conducting material inside is exposed, distanced by a certain gap may serve as the conducting regions. Further, each of the exposed conducting regions 201-1 and 201-2 in the first wire 200-1 and its corresponding each of the exposed conducting regions 202-1 and 202-2 in the second wire 200-2 may be disposed within a particular distance from each other. For example, as illustrated in FIG. 1, each of the exposed conducting regions 201-1 and 201-2 in the first wire 200-1 may be disposed as corresponding to each of the exposed conducting regions 202-1 and 202-2 in the second wire 200-2, and if the rainwater makes a contact therebetween, then the current may flow through the first wire 200-1 and the second wire 200-2. For reference, only four of the exposed conducting regions 201-1, 201-2, 202-1, and 202-2 are illustrated in FIG. 1 for convenience of explanation, but the scope of the present disclosure is not limited thereto, and any multiplicity of the exposed conducting regions may be formed in each of the first wire 200-1 and the second wire 200-2.

Also, as another example, each entire region of the first wire 200-1 and the second wire 200-2 disposed on the specific surface of the panel 100 may be exposed, or all of the first wire 200-1 and the second wire 200-2 may be coated with material which becomes conductive if contacted with water, and as a result, each of the first wire 200-1 and the second wire 200-2 as a whole may serve as each conducting region.

As described above, the first wire 200-1 and the second wire 200-2 may be the electric wires with same characteristics. Thus, the characteristics of the first wire 200-1 are described in detail below by referring to FIG. 2 for convenience of explanation.

Figure 2:
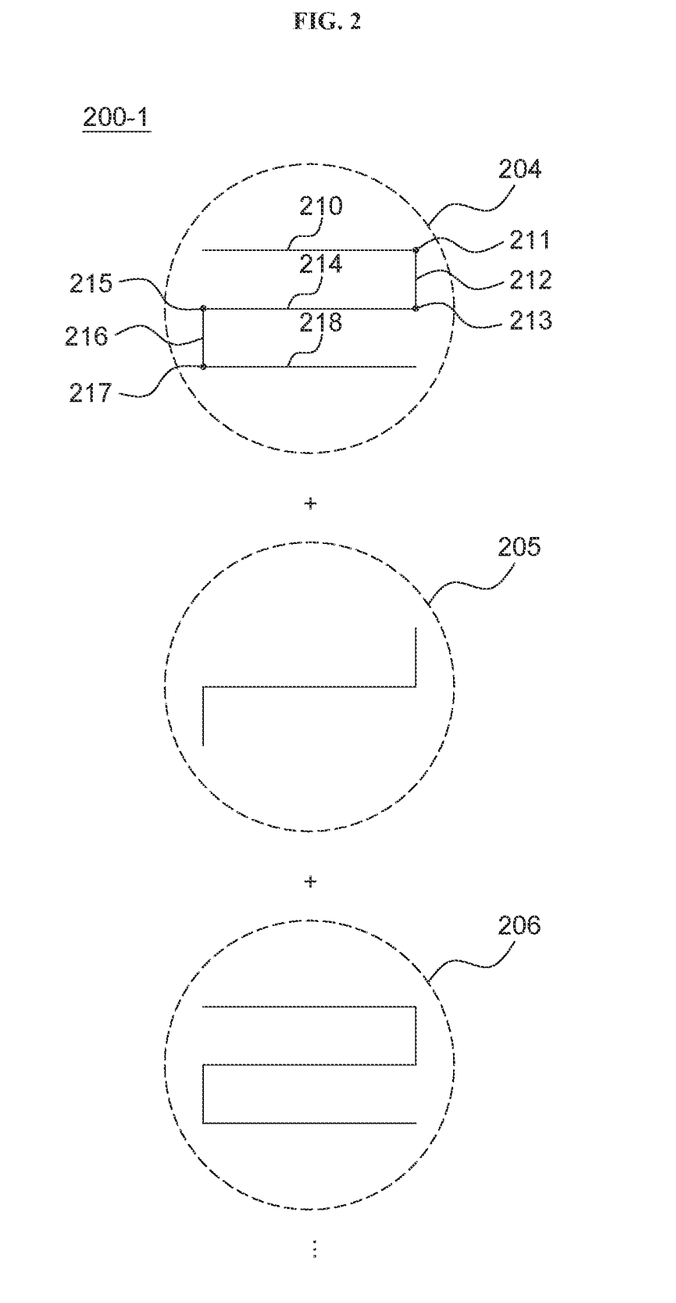
FIG. 2 is a drawing schematically illustrating details of a first wire which is one among the electric wires of the rainwater detection device in accordance with one example embodiment of the present disclosure.

FIG. 2 is a drawing schematically illustrating details of the first wire which is one of the electric wires of the rainwater detection device 1000 in accordance with one example embodiment of the present disclosure.

First, the first wire 200-1 may include continuous first unit wires 204 and 206 and the second wire 200-2 may include continuous second unit wires. Herein, the first unit wires 204 and 206 and the second unit wires may be disposed on the specific surface of the panel 100 such that (i) each of the first unit wires 204 and 206 corresponds to each of the second unit wires, (ii) each of the first unit wires 204 and 206 is separated from its corresponding each of the second unit wires by the specific interval, and (iii) each first group comprised of the first unit wires 204 and 206 and each second group comprised of a certain number of the second unit wires form a preset specific unit pattern. Herein, the specific unit pattern may vary according to examples of the present disclosure, and as one example, FIGS. 1 and 2 illustrate the electric wires disposed in meandering pattern of back and forth. Also, each partial length of each of the first unit wires 204 and 206 and each partial length of each of the second unit wires may not be same where the electric wires change direction.

Also, each of adjacent ones among the first unit wires 204 and 206 may be connected with each other and each of adjacent ones among the second unit wires may be connected with each other. Herein, connection wires for connecting each of the unit wires may have a shape such that the connected unit wires may repeat the specific unit pattern, and as an example, FIG. 2 illustrates one of the connection wires 205 which has a shape of elbow-like curves so that the first wire 200-1 disposed on the specific surface repeats the meandering pattern. However, the shape of the connection wires 205 is not limited to a shape corresponding to the elbow-like curves as described above, and may be a shape such as a straight line, etc. for simply connecting each of the unit wires according to various examples of the present disclosure.

Next, the specific surface of the panel 100 may include (i) a first edge 110 and a second edge 120 facing each other and (ii) a third edge 130 and a fourth edge 140 facing each other and perpendicular to the first edge 110 and the second edge 120. Herein, (i) the first wire 200-1 may be disposed on the specific surface such that the first wire 200-1 forms a continuous first path and (ii) the second wire 200-2 may be disposed on the specific surface such that the second wire 200-2 forms a continuous second path.

Herein, the first unit wires 204 and 206 included in the first wire 200-1 and the second unit wires included in the second wire 200-2 may be disposed on the specific surface of the panel 100 such that (i) certain parts of the first unit wires 204 and 206 and certain parts of the second unit wires are comprised of a (1_1)-st partial unit wire to a (1_n)-th partial unit wire disposed perpendicular to the first edge 110 and the second edge 120, n being an integer equal to or greater than 1 and (ii) if n is larger than 1, specific parts of the first unit wires and specific parts of the second unit wires are comprised of a (2_1)-st partial unit wire to a (2_(n−1))-th partial unit wire disposed perpendicular to the third edge 130 and the fourth edge 140. Herein, a (2_k)-th partial unit wire may connect one end of a (1_k)-th partial unit wire with the other end of a 1_(k+1)-th partial unit wire among the (1_1)-st partial unit wire to the (1_n)-th partial unit wire, k being an integer ranging from 1 to n−1. Further, said the other end of the 1_(k+1)-th partial unit wire may be located opposite to one end of the 1_(k+1)-th partial unit wire farther from the (2_k)-th partial unit wire. And as a result, the (1_k)-th partial unit wire, the (2_k)-th partial unit wire, and the 1_(k+1)-th partial unit wire may be connected in sequence.

As an example of the unit wires described above, by referring to FIG. 2, the first unit wire 204 may include (i) as a case of n=3, a (1_1)-st partial unit wire 210, a (1_2)-nd partial unit wire 214, and a (1_3)-rd partial unit wire 218 and (ii) as a case of k=2, (ii-1) a (2_1)-st partial unit wire 212 connecting one end 211 of the (1_1)-st partial unit wire 210 with the other end 213 of the (1_2)-nd partial unit wire 214 and (ii-2) a (2_2)-nd partial unit wire 216 connecting one end 215 of the (1_2)-nd partial unit wire 214 with the other end 217 of the (1_3)-rd partial unit wire 218. Accordingly, the (1_1)-st partial unit wire 210, the (2_1)-st partial unit wire 212, and the (1_2)-nd partial unit wire 214 may be connected in sequence. Further, the (1_2)-nd partial unit wire 214, the (2_2)-nd partial unit wire 216, and the (1_3)-rd partial unit wire 218 may also be connected in sequence. Herein, each of the (1_1)-st partial unit wire 210, the (1_2)-nd partial unit wire 214, and the (1_3)-rd partial unit wire 218 may be disposed perpendicular to the first edge 110 and the second edge 120 of the panel 100. And each of the (2_1)-st partial unit wire 212 and the (2_2)-nd partial unit wire 216 may be disposed perpendicular to the third edge 130 and the fourth edge 140 of the panel 100.

And, the specific unit pattern, formed by the first group comprised of the first unit wires and the second group comprised of the second unit wires, may be repeated in a direction perpendicular to the third edge 130 and the fourth edge 140. And as an example, FIG. 1 shows a case where the meandering pattern is repeated in a direction perpendicular to the third edge 130 and the fourth edge 140 of the specific surface of the panel 100.

Next, (1) cases of disposing and fixing the first wire 200-1 and the second wire 200-2, as described above, on the specific surface of the panel 100 and (2) characteristics of the first wire 200-1 and the second wire 200-2 for detecting the rainwater efficiently are described in detail below by referring to FIGS. 3A and 3B.

Figure 3A:
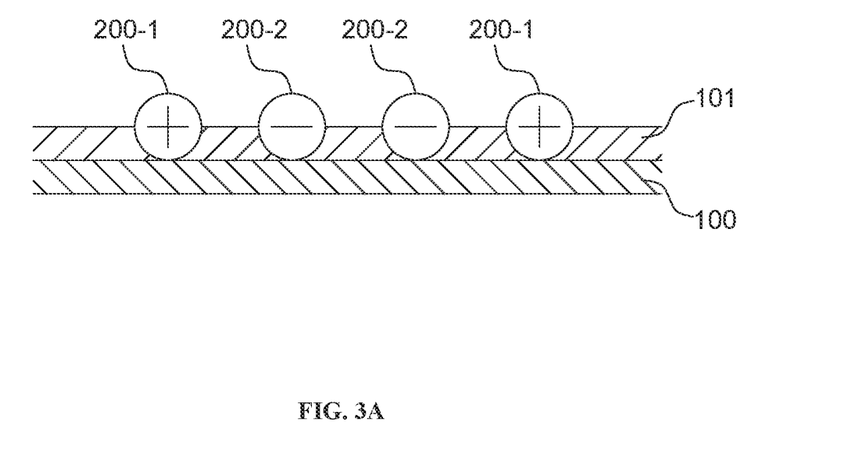
FIG. 3A is a drawing schematically illustrating a cross section of a panel and the electric wires disposed and fixed on the panel of the rainwater detection device in accordance with one example embodiment of the present disclosure.

FIG. 3A is a drawing schematically illustrating a cross section of the panel 100 and the electric wires disposed and fixed on the panel 100 of the rainwater detection device 1000 in accordance with one example embodiment of the present disclosure.

By referring to FIG. 3A, insulation material 101 may be formed on the panel 100 up to a specific height of the first wire 200-1 and the second wire 200-2, in order to fix the first wire 200-1 and the second wire 200-2 in a state of being separated by the specific interval 203. Herein, the specific height may be lower than each height of the first wire 200-1 and the second wire 200-2, so that at least part of upper portions of each of the first wire 200-1 and the second wire 200-2 is exposed to the rainwater.

Figure 3B:
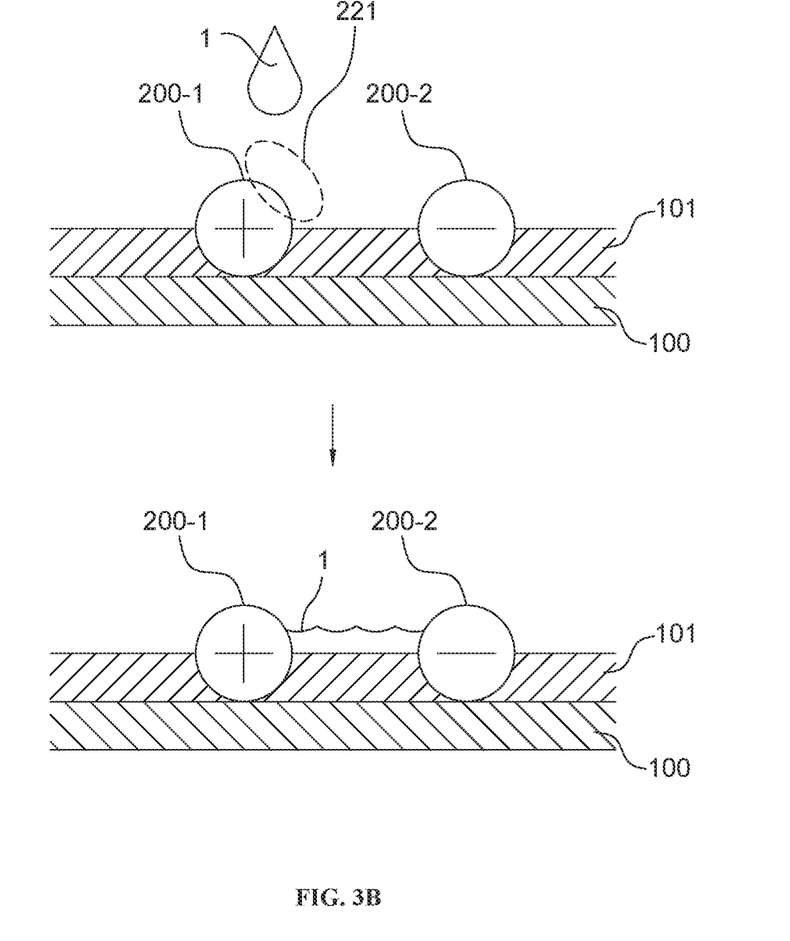
FIG. 3B is a drawing schematically illustrating the rainwater falling on one of electric wires disposed on the panel of the rainwater detection device and accumulated between the electric wires in accordance with one example embodiment of the present disclosure.

And, FIG. 3B is a drawing schematically illustrating the rainwater falling on a specific rainwater sensing wire among the electric wires and accumulated between the electric wires disposed on the panel 100 of the rainwater detection device 1000 in accordance with one example embodiment of the present disclosure.

First, at least part of the upper portions, without insulation, of the first wire 200-1 and the second wire 200-2 may form an arc 221 with a curvature such that (i) the rainwater fallen on at least part, among the upper portions, of the specific rainwater sensing wire, which is one among the first wire 200-1 and the second wire 200-2, flows along a side of the specific rainwater sensing wire due to the arc 221 and (ii) the flowing rainwater comes into contact with the other one among the first wire 200-1 and the second wire 200-2, and as a result, the current may flow between the first wire 200-1 and the second wire 200-2.

As an example of a case above, FIG. 3B shows that if the rainwater 1 falls on an upper portion of the first wire 200-1, the rainwater 1 flows along the side of the first wire 200-1 due to the arc 221 with the curvature on the upper portion of the first wire 200-1, resulting in the rainwater 1 accumulating between the first wire 200-1 and its neighboring second wire 200-2, and thus the current may flow through the rainwater 1 between the first wire 200-1 and the second wire 200-2.

Due to such characteristics of the first wire 200-1 and the second wire 200-2, the rainwater detection device 1000 in accordance with the present disclosure does not require additional work of adjusting an angle of the panel 100 for the rainwater 1 to flow, and the detection of the rainwater 1 is possible even if the panel 100 is installed parallel to the ground, achieving a purpose of the present disclosure.

Figure 4:
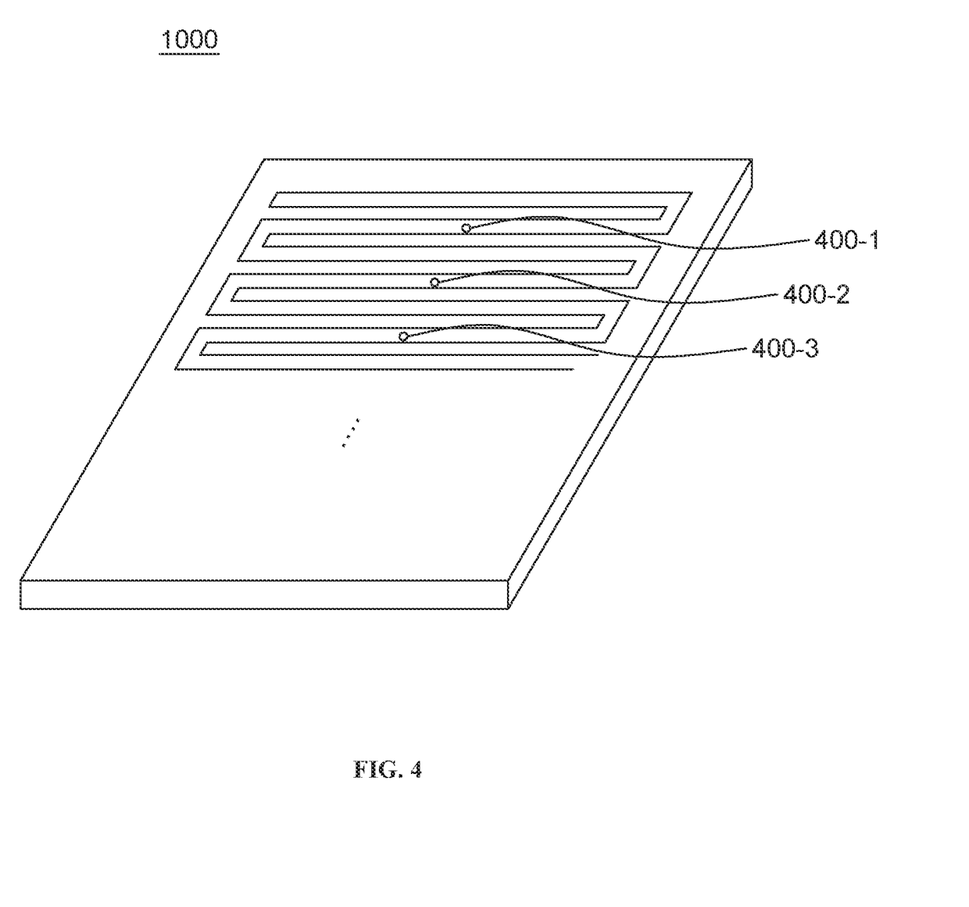
FIG. 4 is a drawing schematically illustrating one or more rainwater drains, for discharging residual rainwater already detected, formed in the rainwater detection device in accordance with one example embodiment of the present disclosure.

And, as another example, FIG. 4 illustrates one or more rainwater drains for discharging residual rainwater, already detected, remaining on the rainwater detection device 1000 in accordance with one example embodiment of the present disclosure.

By referring to FIG. 4, the rainwater drains 400-1, 400-2, and 400-3, controlled to be opened to remove the residual rainwater 1 from the specific surface, may be formed on one or more specific locations on the specific surface of the panel 100. Herein, as shown in FIG. 4, the specific locations may be present between the first wire 200-1 and the second wire 200-2, and as a result, the detection of newly fallen rainwater is performed more efficiently.

The present disclosure has an effect of providing the rainwater detection device having a structure of denser rainwater detection regions formed with the electric wires, resulting in an efficient detection of the rainwater.

The present disclosure has another effect of providing the rainwater detection device which detects the rainwater in various rainfall conditions and whose panel can be installed parallel to the ground.

The present disclosure has still another effect of providing the rainwater drains for discharging the residual rainwater, already detected, to thereby allow the rainwater detection device to efficiently detect new rainwater.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

We claim:

1. A rainwater detection device for detecting rainwater, comprising:
   a panel having at least one specific surface;
   a pair of rainwater sensing wires disposed on the specific surface of the panel; and
   a rainwater sensor (i) physically connected with each end of the pair of the rainwater sensing wires without an electrical connection therewith if an electrical condition is not satisfied and (ii) physically and electrically connected with said each end of the pair of the rainwater sensing wires if the electrical condition is satisfied;
   wherein each of the pair of the rainwater sensing wires is disposed on the specific surface of the panel such that a first wire, which is one among the pair of the rainwater sensing wires, is separated from a second wire, which is the other among the pair of the rainwater sensing wires, by a specific interval, without physically contacting each other and wherein each end of the pair of the rainwater sensing wires is connected to each end of opposite polarity of an electrode included in or connected with the rainwater sensor;
   wherein the electrical condition is that a first state in which no current flows between the first wire and the second wire on the specific surface is changed to a second state in which current flows between the first wire and the second wire on the specific surface due to the rainwater;
   wherein insulation material is formed on the specific surface up to a specific height of the first wire and the second wire and wherein the specific height is lower than each height of the first wire and the second wire, in order to fix the first wire and the second wire in a state of being separated by the specific interval; and
   wherein at least part of upper portions, without insulation, of the first wire and the second wire forms an arc with a curvature such that (i) the rainwater fallen on at least part, among the upper portions, of a specific rainwater sensing wire, which is one among the first wire and the second wire, flows along a side of the specific rainwater sensing wire due to the arc and (ii) the rainwater comes into contact with the other one among the first wire and the second wire, and as a result, the current flows between the first wire and the second wire.

2. The rainwater detection device of claim 1, wherein the first wire includes continuous first unit wires and wherein the second wire includes continuous second unit wires, wherein the first unit wires and the second unit wires are disposed on the specific surface such that (i) each of the first unit wires corresponds to each of the second unit wires, (ii) each of the first unit wires is separated from its corresponding each of the second unit wires by the specific interval, and (iii) each first group comprised of a certain number of the first unit wires and each second group comprised of a certain number of the second unit wires form a preset specific unit pattern, and wherein each of adjacent ones among the first unit wires is connected with each other and each of adjacent ones among the second unit wires is connected with each other.

3. The rainwater detection device of claim 2, wherein the specific surface of the panel includes (i) a first edge and a second edge opposite to each other and (ii) a third edge and a fourth edge opposite to each other and perpendicular to the first edge and the second edge, wherein (i) the first wire is disposed on the specific surface such that the first wire forms a continuous first path and (ii) the second wire is disposed on the specific surface such that the second wire forms a continuous second path, wherein the first unit wires and the second unit wires are disposed on the specific surface such that (i) certain parts of the first unit wires and certain parts of the second unit wires are comprised of a (1_1)-st partial unit wire to a (1_n)-th partial unit wire disposed perpendicular to the first edge and the second edge, wherein n is an integer equal to or greater than 1 and (ii) if n is larger than 1, specific parts of the first unit wires and specific parts of the second unit wires are comprised of a (2_1)-st partial unit wire to a (2_(n−1))-th partial unit wire disposed perpendicular to the third edge and the fourth edge, wherein a (2_k)-th partial unit wire connects one end of a (1_k)-th partial unit wire with another end of a 1_(k+1)-th partial unit wire among the (1_1)-st partial unit wire to the (1_n)-th partial unit wire and wherein said another end of the 1_(k+1)-th partial unit wire is located opposite to one end of the 1_(k+1)-th partial unit wire farther from the (2_k)-th partial unit wire and such that the (1_k)-th partial unit wire, the (2_k)-th partial unit wire, and the 1_(k+1)-th partial unit wire are connected in sequence, k being an integer ranging from 1 to n−1, and wherein the specific unit pattern, formed by each first group and each second group, is repeated in a direction perpendicular to the third edge and the fourth edge.

4. The rainwater detection device of claim 1, wherein each of the first wire and the second wire includes conducting material and wherein at least part of the conducting material is exposed such that one or more conducting regions, where the current flows through the rainwater if the rainwater comes into contact with the exposed conducting material, are present, and wherein each of the conducting regions of the first wire and its corresponding each of the conducting regions of the second wire are disposed within a particular distance.

5. The rainwater detection device of claim 1, wherein the rainwater detection device further includes a sensing information processing module and wherein (i) the rainwater sensor transmits sensing information, including information on voltage, current, and resistance of the first wire and the second wire, to the sensing information processing module, (ii) the sensing information processing module analyzes the sensing information, and thus (iii) result information, including information on whether the rainwater is detected, is provided.

6. The rainwater detection device of claim 1, wherein one or more rainwater drains, controlled to be opened to remove the rainwater, already detected and remaining on the specific surface, are formed on one or more specific locations on the specific surface.

\* \* \* \* \*